United States Patent [19]

Masuda

[11] Patent Number: 5,174,806
[45] Date of Patent: Dec. 29, 1992

[54] NEUTRAL SOLID FERTILIZER

[76] Inventor: Toshio Masuda, 37-12 Bessho-machi, Ohmiya, Japan

[21] Appl. No.: 651,178

[22] Filed: Feb. 6, 1991

[30] Foreign Application Priority Data

Feb. 13, 1990 [JP] Japan .................................. 2-29527

[51] Int. Cl.$^5$ ........................... C05G 4/00; C05G 3/00
[52] U.S. Cl. ...................................... 71/29; 71/64.03; 71/64.13
[58] Field of Search ............ 71/DIG. 2, 64.03, 64.13, 71/64.1, 28–30, 1

[56] References Cited

FOREIGN PATENT DOCUMENTS 306205  5/1984  European Pat. Off.
223681 12/1983  Japan .................................. 71/64.1
1087503 4/1984  U.S.S.R. ............................. 71/64.1

OTHER PUBLICATIONS

CA 89(19):162335C "Synthetic Growing Medium" Carson et al., 1978.

*Primary Examiner*—Ferris Lander
*Attorney, Agent, or Firm*—Pennie & Edmonds

[57] ABSTRACT

The invention provides a neutral granular fertilizer comprising a neutral fertilizing composition containing as essential ingredients nitrogenous, phosphatic and potash fertilizers and an organic acid, and 10–20 parts by weight of plaster per 100 parts of the fertilizing composition.

It also provides a neutral powdery fertilizer in the form of finely divided and uniform dispersion comprising a neutral fertilizer containing as essential ingredients nitrogenous, phosphatic and potash fertilizers and an organic acid.

2 Claims, No Drawings

NEUTRAL SOLID FERTILIZER

FIELD OF THE INVENTION

The present invention relates to a neutral solid fertilizer which does not liberate sulfate anion.

BACKGROUND OF THE INVENTION

Current chemical fertilizers are mainly composed of salts except for urea and strongly acidic regardless of their forms such as granules, dust, and liquids.

PROBLEMS TO BE SOLVED BY THE INVENTION

Conventional fertilizers render the soil of cultivated areas and paddy fields acidic due to accumulation of inorganic acid salts, mainly sulfates, causing various crop injuries (e.g. injury by continuous cropping). Development of a neutral fertilizer which does not liberate sulfate anion has been needed in order to protect soil of cultivated areas and paddy fields from acidification, and to maintain productive soil.

A solid fertilizer prepared by mixing an acidic and a basic dust fertilizers practically resulted in a cluster formation and are disadvantageous to use.

An object of the present invention is to provide a neutral granular fertilizer and also a powdery fertilizer which neither cause injuries due to accumulation nor form a cluster.

MEANS FOR SOLVING THE PROBLEM

It has surprisingly been found that the above object can be achieved by using a neutral liquid fertilizer, which prevents the evolution of heat of neutralization between an acid and an alkali through the use of an organic acid and urea and which does not liberate sulfate anion substantially.

SUMMARY OF THE INVENTION

In the first aspect, the invention relates to a neutral granular fertilizer which comprises a neutral fertilizing composition containing as essential ingredients nitrogenous, phosphatic and potash fertilizer and an organic acid, and 10-20 parts by weight of plaster per 100 parts of said fertilizing composition.

The second aspect of the invention is to provide a neutral powdery fertilizer in the form of finely divided and uniform dispersion which comprises as essential ingredients nitrogenous, phosphatic and potash fertilizers and organic acid.

In the invention, ammonium sulfate is typically used as a nitrogen source, liquid phosphoric acid as a phosphoric acid source and potassium hydroxide as a potassium source.

The neutral solid fertilizer of the invention may contain trace elements such as Mn, Fe, B, Cu, Zn, and Cl in addition to the above ingredients.

The neutral granular fertilizer of the invention may contain a thickener to afford the product sufficient hardness and shape-retaining property to control the release of the ingredients. Examples of the thickener are synthetic resin such as polyvinyl alcohol, sodium alginate and seaweed extract. Preferably, sodium alginate is used which has buffering effect on the pH of the product. The thickener serves to encapsulate essential ingredients such as nitrogenous, phosphatic and potash fertilizer, thus not only allowing them to leak out slowly into soil water but also imparting the product hardness and shape-retaining property in soil water.

Suitable organic acids include citric acid, acetic acid, malic acid and fumaric acid.

The solid fertilizer of the invention can produce a neutral liquid fertilizer having a suitable proportion of N, P and K, and prevents the evolution of heat of neutralization between an acid and an alkali through the use of organic acid and urea.

The neutral granular fertilizer of the invention contains plaster such as gypsum and plaster of Paris. The amount of plaster may be 10-20 parts, preferably 13-18 parts by weight per 100 parts of the fertilizing composition.

The neutral powdery fertilizer of the invention may contain clay to facilitate the formation of finely divided and uniform, dispersion. Any clay comprising 1:1, 2:1, mixed layered and amorphous type mineral clay and commercially available clay, for example, kaolin, bentonite, allophane, montmorillonite and the like may be used. Minimum amount of clay used is preferably those sufficient to avoid an obstruction of a spray nozzle and other possible disadvantageous effects.

A neutral solid fertilizer of the invention prevents soil from acidification, facilitates absorption of nutrients into plants and increases the crop yields because of less damage produced by insects or diseases. The fertilizer of the invention does not acidify soil, and adheres to soil calloid well and keeps the essential ingredients from flowing away. The granular fertilizer decomposes slowly in soil water and may serve as a controlled release fertilizer.

EXAMPLE

The following Examples further illustrate, but not limit the invention.

REFERENCE EXAMPLE 1

Preparation of a Neutral Liquid Fertilizer 100 l of water was placed in a 200 l enameled tank equipped with a stirrer, a thermometer, and a condenser. 1 Kg of citric acid was added to the tank with stirring. A total of 18 kg of 75% liquid phosphoric acid was then added in 1 kg portions with stirring over a period of 30 minutes (during this period, the temperature of the mixture was raised to 28°-30° C.). A total of 17 kg of potassium hydroxide flakes was then added in 1 kg portions to the mixture over a period of 30 minutes with keeping the temperature at 60° C. Even after the addition of potassium hydroxide was completed, the neutralization reaction of the mixture still proceeded, causing an elevation of the temperature to about 90° C. When the temperature of the mixture stopped rising, 20 kg of urea was added all at once, resulting in decrease of the temperature rapidly to 50°-60° C., and then slowly to about 40° C. Thereafter, the addition of the above described liquid phosphoric acid, potassium hydroxide and urea was repeated twice. A neutral liquid fertilizer containing about 12% each nitrogenous, phosphatic and potash fertilizer was obtained.

REFERENCE EXAMPLE 2

2 Kg of sodium alginate was added to the neutral liquid fertilizer as obtained in Reference Example 1 to give a viscous and neutral liquid fertilizer.

EXAMPLE 1

The neutral liquid fertilizer prepared in Reference Example 1 was concentrated at 60° C. to 88% dry weight content. After concentration, 14 parts by weight of plaster (16% by weight of fertilizing component) was added to 100 parts by weight of the concentrate. The mixture was granulated and heated, and then dried. The resultant granules were 1.5–5.5 mm in diameter.

Average hardness of those granules having 3.5–4.5 mm in diameter was more than 3 kg on a hardness meter (Kiya). The granules did not decompose easily in water in a short period of time, indicating the shape-retaining property of them in water.

When 1 g of the granular fertilizer was added to 100 ml of water at 25° C., the pH was within 7–10.

EXAMPLE 2

The procedure of Example 1 was repeated using the neutral liquid fertilizer of Reference Example 2 to produce a granular fertilizer of 1.5–5.5 mm in diameter.

Average hardness of the granules (3.5–4.5 mm in diameter) was more than 5 kg. The granules were more stable in water than those of Example 1. The granules are expected to serve as a controlled release fertilizer in a flooded field.

EXAMPLE 3

The neutral liquid fertilizer as described in Reference Example 1 was concentrated at 60° C. to 95% dry weight content. The concentrate was then further heated to 120° C. and sprayed through a spray nozzle into a drying chamber maintained at 120° C. Liquid particles less than 120 μm in mean diameter were sprayed out from the nozzle. Thus, a neutral powdery fertilizer in the form of a finely divided and uniform dispersion without any cluster formation was obtained.

Alternatively, 2% by weight of bentonite may be added to the neutral liquid fertilizer of Reference Example 1 during concentration. A powdery fertilizer thus prepared had higher dispersibility.

What is claimed is:

1. A method for preparing a solid neutral fertilizer containing as essential ingredients nitrogenous, phosphatic and potash fertilizers and an organic acid selected from the group consisting of citric acid, acetic acid, malic acid and fumaric acid, comprising:
   (a) adding an organic acid selected from the group consisting of citric acid, acetic acid, fumaric acid and malic acid, to water with stirring;
   (b) gradually adding liquid phosphoric acid with stirring while raising the temperature of the mixture to about 28°–30° C;
   (c) gradually adding potassium hydroxide while maintaining the temperature of the mixture at about 60° C. for about 30 minutes and then permitting the temperature to rise to about 90° C.;
   (d) adding urea to the mixture to form a neutral liquid fertilizer containing a nitrogenous, phosphatic and potash fertilizer and an organic acid or derivative thereof;
   (e) repeating steps (b)–(d) above twice; and
   (f) concentrating the neutral liquid fertilizer of step (e), and (g) adding 10–20 parts by weight of plaster per 100 parts by weight of the fertilizer to form the solid neutral fertilizer composition.

2. The method according to claim 1, in which about 14 parts by weight of plaster is added in step (g).

* * * * *